UNITED STATES PATENT OFFICE.

MEINHARD HOFFMANN, OF MAINKUR, NEAR FRANKFORT-ON-THE-MAIN, ASSIGNOR TO LEOPOLD CASSELLA & CO., OF FRANKFORT-ON-THE-MAIN, GERMANY.

RED COLORING-MATTER FROM GAMMA DISULPHONIC ACID OF BETA-NAPHTHOL.

SPECIFICATION forming part of Letters Patent No. 314,939, dated March 31, 1885.

Application filed February 7, 1884. (Specimens.)

*To all whom it may concern:*

Be it known that I, MEINHARD HOFFMANN, doctor of philosophy, a subject of the Emperor of Germany, and residing at Mainkur, near Frankfort-on-the-Main, Germany, have invented new and useful Improvements in the Manufacture of new Coloring-Matters, of which the following is a specification.

My invention relates to a new dye-stuff, which results from the reaction of amidobenzole with the gamma disulphonic acid of beta-naphthol in alkaline solution.

The preparation and properties of my new gamma disulphonic acid of beta-naphthol I have described in my application for a patent dated this day.

In order to produce a red coloring-matter, I thoroughly mix 19.7 parts of amidoazobenzole with twenty-five parts of muriatic acid (of thirty-three per cent. HCl) and two hundred parts and fifty of water; and to this mixture I add 6.9 parts of nitrite of sodium dissolved in twenty parts of water, taking care while mixing to keep the temperature below 5° centigrade, (41° Fahrenheit.) After some time the diazo compound is formed, and then its solution is introduced into a solution of thirty-eight parts of the potassium salt of the gamma disulphonic acid in two hundred and fifty parts of water, to which ten parts of aqueous ammonia (of twenty-five per cent. $NH_3$) are added. The new coloring-matter is separated entirely by addition of an aqueous solution of one hundred parts of common salt.

The color deposits in the form of a red powder, and is obtained by recrystallization in the form of greenish shining small crystals. By dissolving the new coloring-matter in concentrated sulphuric acid a solution of a violet shade is obtained. The aqueous solution of the color is precipitated by addition of an acid.

The new coloring-matter dyes wool, silk, and other fabrics, especially mordanted cotton, a brilliant scarlet shade.

Having thus described my invention, what I claim as new, and desire to secure by Letters Patent, is—

As a new dye-stuff, the scarlet-red coloring-matter produced by the action of the diazo compound of amidoazobenzole upon an alkaline solution of gamma disulphonic acid of beta-naphthol, as herein set forth.

In testimony whereof I have signed my name to this specification in the presence of two subscribing witnesses.

MEINHARD HOFFMANN.

Witnesses:
 FRANZ WIRTH,
 FRANZ HASSLACHER.